US008308559B2

(12) United States Patent
Chun

(10) Patent No.: US 8,308,559 B2
(45) Date of Patent: Nov. 13, 2012

(54) PARADISE BOX GAMING SYSTEM

(76) Inventor: Jay Chun, Hong Kong (CN)

(*) Notice: Subject to any disclaimer, the term of this patent is extended or adjusted under 35 U.S.C. 154(b) by 770 days.

(21) Appl. No.: 11/800,885

(22) Filed: May 7, 2007

(65) Prior Publication Data

US 2008/0280667 A1 Nov. 13, 2008

(51) Int. Cl.
*A63F 13/00* (2006.01)

(52) U.S. Cl. ............................................ 463/31; 463/25

(58) Field of Classification Search .................... 463/20, 463/40–42, 25, 31
See application file for complete search history.

(56) References Cited

U.S. PATENT DOCUMENTS

| | | | |
|---|---|---|---|
| 3,810,627 | A | 5/1974 | Levy |
| 3,909,002 | A | 9/1975 | Levy |
| 4,339,798 | A | 7/1982 | Hedges |
| 4,467,424 | A | 8/1984 | Hedges |
| 4,659,082 | A | 4/1987 | Greenberg |
| 4,861,041 | A | 8/1989 | Jones et al. |
| 4,926,327 | A | 5/1990 | Sidley |
| 5,033,744 | A | 7/1991 | Bridgeman |
| 5,042,818 | A | 8/1991 | Weingardt |
| 5,048,833 | A | 9/1991 | Lamle |
| 5,362,064 | A | 11/1994 | Lofink et al. |
| 5,393,067 | A | 2/1995 | Paulsen |
| 5,395,119 | A | 3/1995 | Jacob et al. |
| 5,395,120 | A | 3/1995 | Malek |
| 5,476,259 | A | 12/1995 | Weingardt |
| 5,605,334 | A | 2/1997 | McCrea |
| 5,639,092 | A | 6/1997 | Macaisa |
| 5,669,606 | A | 9/1997 | Brown |
| 5,673,917 | A | 10/1997 | Vancura |
| 5,707,287 | A | 1/1998 | McCrea, Jr. |
| 5,735,525 | A | 4/1998 | McCrea |
| 5,762,552 | A | 6/1998 | Vuong et al. |
| 5,770,533 | A | 6/1998 | Franchi |
| 5,779,546 | A | 7/1998 | Meissner |
| 5,788,574 | A | 8/1998 | Ornstein |
| 5,795,225 | A | 8/1998 | Jones |
| 5,800,268 | A | 9/1998 | Molnick |
| 5,806,854 | A | 9/1998 | Coleman |
| 5,830,067 | A | 11/1998 | Graves |
| 5,836,818 | A | 11/1998 | Jones |
| 5,842,698 | A | 12/1998 | Brown |
| 5,876,283 | A | 3/1999 | Parra et al. |
| 5,909,876 | A | 6/1999 | Brown |
| 5,911,626 | A | 6/1999 | McCrea |
| 5,921,865 | A | 7/1999 | Scagnelli |
| 5,957,459 | A | 9/1999 | Chae |
| 5,961,119 | A | 10/1999 | Brown |

(Continued)

FOREIGN PATENT DOCUMENTS

CA 2377577 6/2000

(Continued)

OTHER PUBLICATIONS

International Search Report for PCT/CA2006/002069, mailed Mar. 20, 2007, 16 pgs. International Search Report for PCT/CA2006/001295, mailed Nov. 2, 2006, 17 pgs.
*EZ Baccarat*, DP Stud, Inc., www.ezbaccarat.com, 2 pgs. (2003).

*Primary Examiner* — Masud Ahmed
(74) *Attorney, Agent, or Firm* — Jennifer Meredith, Esq.; Meredith & Keyhani, PLLC

(57) ABSTRACT

A system for playing a casino game and a slot machine game is disclosed.

13 Claims, 12 Drawing Sheets

U.S. PATENT DOCUMENTS

| | | | | |
|---|---|---|---|---|
| 6,001,016 | A | 12/1999 | Walker | |
| 6,019,374 | A | 2/2000 | Breeding | |
| 6,093,103 | A | 7/2000 | McCrea | |
| 6,117,012 | A | 9/2000 | McCrea | |
| 6,146,270 | A | 11/2000 | Huard | |
| 6,159,095 | A * | 12/2000 | Frohm et al. | 463/19 |
| 6,217,447 | B1 | 4/2001 | Lofink | |
| 6,279,910 | B1 | 8/2001 | De Keller | |
| 6,293,864 | B1 | 9/2001 | Romero | |
| 6,345,824 | B1 | 2/2002 | Selitzky | |
| 6,346,044 | B1 | 2/2002 | McCrea, Jr. | |
| 6,361,437 | B1 | 3/2002 | Walker | |
| 6,375,567 | B1 | 4/2002 | Acres | |
| 6,409,602 | B1 | 6/2002 | Wiltshire | |
| 6,460,848 | B1 | 10/2002 | Soltys et al. | |
| 6,508,709 | B1 | 1/2003 | Karmarkar | |
| 6,511,072 | B1 | 1/2003 | Santa Cruz et al. | |
| 6,517,436 | B2 | 2/2003 | Soltys | |
| 6,540,230 | B1 | 4/2003 | Walker | |
| 6,569,018 | B2 | 5/2003 | Jaffe | |
| 6,575,834 | B1 | 6/2003 | Lindo | |
| 6,582,301 | B2 | 6/2003 | Hill | |
| 6,588,758 | B1 | 7/2003 | Lee | |
| 6,626,757 | B2 | 9/2003 | Oliveras | |
| 6,628,244 | B1 | 9/2003 | Hirosawa et al. | |
| 6,712,696 | B2 | 3/2004 | Soltys | |
| 6,719,291 | B1 | 4/2004 | deKeller | |
| 6,726,564 | B2 | 4/2004 | Hogan | |
| 6,755,741 | B1 | 6/2004 | Rafaeli | |
| 6,800,026 | B2 | 10/2004 | Cannon | |
| 6,808,173 | B2 | 10/2004 | Snow | |
| 6,837,494 | B2 | 1/2005 | Lee | |
| 6,896,614 | B2 | 5/2005 | Romero | |
| 6,916,245 | B1 | 7/2005 | Vancura et al. | |
| 7,008,319 | B2 * | 3/2006 | Montgomery et al. | 463/21 |
| 7,070,505 | B2 * | 7/2006 | Vancura et al. | 463/25 |
| 7,114,724 | B2 | 10/2006 | Ritzer | |
| 7,189,161 | B1 | 3/2007 | Wiltshire | |
| 7,198,272 | B2 | 4/2007 | Duhamel | |
| 7,213,812 | B2 | 5/2007 | Schubert et al. | |
| 7,264,241 | B2 | 9/2007 | Schubert et al. | |
| 7,303,475 | B2 | 12/2007 | Britt | |
| 7,309,065 | B2 * | 12/2007 | Yoseloff et al. | 273/292 |
| 7,316,615 | B2 | 1/2008 | Soltys | |
| 7,325,806 | B1 | 2/2008 | Feola | |
| 7,367,884 | B2 | 5/2008 | Breeding | |
| 7,404,765 | B2 | 7/2008 | Soltys | |
| 7,407,438 | B2 | 8/2008 | Schubert | |
| 7,419,160 | B1 | 9/2008 | D'Ambrosio | |
| 7,434,805 | B2 | 10/2008 | Grauzer | |
| 7,451,987 | B1 | 11/2008 | Feola | |
| 7,591,728 | B2 | 9/2009 | Gioia | |
| 7,621,533 | B2 | 11/2009 | Kenny | |
| 7,731,586 | B2 | 6/2010 | Letovsky | |
| 7,735,657 | B2 | 6/2010 | Johnson | |
| 7,753,798 | B2 | 7/2010 | Soltys | |
| 7,762,889 | B2 | 7/2010 | Shigeta | |
| 7,769,232 | B2 | 8/2010 | Downs | |
| 7,780,515 | B2 | 8/2010 | Okada | |
| 7,914,368 | B2 | 3/2011 | Chun | |
| 7,918,723 | B2 | 4/2011 | Chun | |
| 7,922,587 | B2 | 4/2011 | Chun | |
| 2001/0000118 | A1 | 4/2001 | Sines et al. | |
| 2001/0029200 | A1 | 10/2001 | Romero | |
| 2002/0002070 | A1 | 1/2002 | Romero | |
| 2002/0002073 | A1 * | 1/2002 | Montgomery et al. | 463/13 |
| 2002/0015489 | A1 | 2/2002 | Ben-David | |
| 2002/0068635 | A1 | 6/2002 | Hill | |
| 2002/0072407 | A1 | 6/2002 | Soltys et al. | |
| 2002/0094869 | A1 | 7/2002 | Harkham | |
| 2002/0111205 | A1 | 8/2002 | Beavers | |
| 2002/0115489 | A1 | 8/2002 | Jordan | |
| 2002/0147042 | A1 | 10/2002 | Vuong et al. | |
| 2002/0147047 | A1 | 10/2002 | Letovsky | |
| 2003/0003997 | A1 | 1/2003 | Vuong | |
| 2003/0013510 | A1 | 1/2003 | Vuong et al. | |
| 2003/0050107 | A1 | 3/2003 | Moody | |
| 2003/0064781 | A1 | 4/2003 | Muir | |
| 2003/0069071 | A1 | 4/2003 | Britt | |
| 2003/0104854 | A1 | 6/2003 | Cannon | |
| 2003/0151199 | A1 | 8/2003 | Lee | |
| 2003/0151201 | A1 | 8/2003 | Lee | |
| 2003/0232651 | A1 | 12/2003 | Huard | |
| 2004/0023712 | A1 | 2/2004 | Oliver | |
| 2004/0023722 | A1 | 2/2004 | Vuong | |
| 2004/0087357 | A1 * | 5/2004 | Johnson | 463/17 |
| 2004/0108656 | A1 | 6/2004 | Snow | |
| 2004/0116179 | A1 * | 6/2004 | Nicely et al. | 463/25 |
| 2004/0224777 | A1 | 11/2004 | Smith | |
| 2004/0235542 | A1 * | 11/2004 | Stronach et al. | 463/6 |
| 2005/0062227 | A1 | 3/2005 | Grauzer et al. | |
| 2005/0073102 | A1 | 4/2005 | Yoseloff et al. | |
| 2005/0218597 | A1 | 10/2005 | Parsadaian | |
| 2005/0233794 | A1 * | 10/2005 | Cannon et al. | 463/16 |
| 2006/0052168 | A1 | 3/2006 | Shacham | |
| 2006/0063577 | A1 | 3/2006 | Downs | |
| 2006/0071429 | A1 | 4/2006 | Okujyo et al. | |
| 2006/0103071 | A1 | 5/2006 | Ritzer | |
| 2006/0128472 | A1 | 6/2006 | Beavers | |
| 2006/0148547 | A1 | 7/2006 | Montgomery | |
| 2006/0166726 | A1 | 7/2006 | Chun | |
| 2006/0178181 | A1 | 8/2006 | Chun | |
| 2006/0226605 | A1 | 10/2006 | Kenny | |
| 2006/0287042 | A1 * | 12/2006 | Osawa | 463/16 |
| 2006/0287058 | A1 * | 12/2006 | Resnick et al. | 463/19 |
| 2007/0026922 | A1 | 2/2007 | Lindo | |
| 2007/0026947 | A1 | 2/2007 | Chun | |
| 2007/0032283 | A1 | 2/2007 | Chun | |
| 2007/0060259 | A1 | 3/2007 | Pececnik | |
| 2007/0135204 | A1 * | 6/2007 | Nicely | 463/17 |
| 2007/0155512 | A1 * | 7/2007 | Wells et al. | 463/46 |
| 2007/0218968 | A1 | 9/2007 | Snow | |
| 2007/0243927 | A1 | 10/2007 | Soltys | |
| 2007/0243929 | A1 * | 10/2007 | Skotarczak et al. | 463/31 |
| 2007/0243935 | A1 | 10/2007 | Huizinga | |
| 2008/0009334 | A1 * | 1/2008 | Walker et al. | 463/16 |
| 2008/0026807 | A1 | 1/2008 | Moshal | |
| 2008/0076499 | A1 | 3/2008 | Lowery | |
| 2008/0085769 | A1 * | 4/2008 | Lutnick et al. | 463/41 |
| 2008/0108400 | A1 | 5/2008 | Chun | |
| 2008/0113778 | A1 | 5/2008 | Chun | |
| 2008/0113783 | A1 | 5/2008 | Czyzewski | |
| 2008/0146311 | A1 * | 6/2008 | Walker et al. | 463/20 |
| 2008/0194334 | A1 | 8/2008 | Kuok | |
| 2008/0230993 | A1 | 9/2008 | Chun | |
| 2008/0254881 | A1 * | 10/2008 | Lutnick et al. | 463/31 |
| 2008/0280667 | A1 | 11/2008 | Chun | |
| 2008/0280668 | A1 | 11/2008 | Chun | |
| 2008/0305855 | A1 | 12/2008 | Czyzewski | |
| 2009/0029755 | A1 | 1/2009 | Chun | |
| 2009/0061974 | A1 | 3/2009 | Lutnick | |
| 2009/0069079 | A1 | 3/2009 | Britt | |
| 2009/0115133 | A1 | 5/2009 | Kelly | |
| 2009/0176547 | A1 | 7/2009 | Katz | |
| 2009/0221360 | A1 | 9/2009 | Wooding | |
| 2010/0102511 | A1 | 4/2010 | Tammesoo | |
| 2010/0105457 | A1 | 4/2010 | Miller | |
| 2010/0105459 | A1 | 4/2010 | Miller | |
| 2010/0113119 | A1 | 5/2010 | Miller | |
| 2010/0117299 | A1 | 5/2010 | Nicely | |
| 2010/0222133 | A1 | 9/2010 | Spencer | |
| 2010/0255897 | A1 | 10/2010 | Pececnik | |
| 2010/0295247 | A1 | 11/2010 | Laduca | |
| 2011/0031694 | A1 | 2/2011 | Cohen | |
| 2011/0039612 | A1 | 2/2011 | Pececnik | |
| 2011/0105207 | A1 | 5/2011 | Chun | |
| 2011/0140362 | A1 | 6/2011 | Chun | |
| 2011/0159965 | A1 | 6/2011 | Chun | |

FOREIGN PATENT DOCUMENTS

| | | |
|---|---|---|
| EP | 1 101513 | 5/2001 |
| EP | 1892683 | 2/2008 |
| GB | 2408696 | 6/2005 |
| GB | 2430385 | 3/2007 |
| WO | 0079467 | 12/2000 |
| WO | 0217841 | 3/2002 |
| WO | 2005056134 | 6/2005 |
| WO | 2007016035 | 2/2007 |
| WO | 2007099334 | 3/2008 |
| WO | 2008026950 | 3/2008 |
| WO | 2008092385 | 8/2008 |
| WO | 2009107131 | 9/2009 |

* cited by examiner

PARADISE BOX GAMING SYSTEM

BACKGROUND OF THE INVENTION

The present invention is generally directed to a gaming system that allows a player to play a live baccarat game and a slot machine game.

In casino games, such as the baccarat game, there is generally a count-down time during which a player of the game will need to wait for the count-down result. This waiting period results in frustration of the player (see FIG. 1), waste of the resource of the gaming establishment, and, as the result, reduced revenue by the gaming establishment.

Therefore, there is need for a mechanism that provides activities to a player during the count-down time of a game.

The embodiments described below address the above-described issues and needs.

SUMMARY OF THE INVENTION

The present invention provides a gaming system for playing a casino game other than a slot machine game and a slot machine game. In some embodiments, the gaming system comprises a main cabinet comprising a mechanism for playing a live baccarat game, a Sic Bo game, a Roulette game, a Fish-Prawn-Crab game, or a Wheel of Fortune game, and a mechanism for playing a slot machine game, and a screen for displaying the slot machine game.

In some embodiments, the main cabinet comprises a upper screen and a lower screen for playing the live baccarat game, the Sic Bo game, or the Roulette game. The screen for displaying the slot machine game can be stand-alone screen or can be connected to the main cabinet. The screen for displaying the slot machine game can be fixed or foldable. In some embodiments, the screen for displaying the slot machine game is connected to the main cabinet, e.g., either connected to the upper screen or connected to the lower screen through a connection mechanism. The connection mechanism can be a hinge(s) or an arm(s). In some embodiments, the connection mechanism is integrated extension of the main cabinet, e.g., the upper or the lower screen. In some embodiments, the connection mechanism comprises hinge(s) (e.g., one, two, three or more hinges), allowing the screen for displaying the slot machine game to be folded to the main cabinet to cover up the upper screen or the lower screen. In some embodiments, the connection mechanism comprises a metallic arm or metallic arm(s) (e.g., one, two, three, or more arms).

In some embodiments, the screen for displaying a slot machine game can also allow the playing of slot machine games based on a stand alone server.

The mechanism for playing a casino game is well known in the art of gaming. Systems (e.g., devices and apparatus) or parts or components thereof embodying such gaming mechanism or a part thereof is either commercially available or can be readily constructed or built by an ordinary artisan.

In some embodiments, the present invention also provides a software program or a set of software programs for carrying out any or all steps of the betting method described herein. The gaming system can also be incorporated into an electronic device or an entertainment gaming machine. Representative electronic devices include, but are not limited to, laptop computers or desktop computers.

In some embodiments, the present invention also provides a software program or a set of software programs for carrying out any or all steps of the betting method described herein. The gaming system can also be incorporated into an electronic device or an entertainment gaming machine. Representative electronic devices include, but are not limited to, laptop computers or desktop computers.

DETAILED DESCRIPTION

Figure 1:
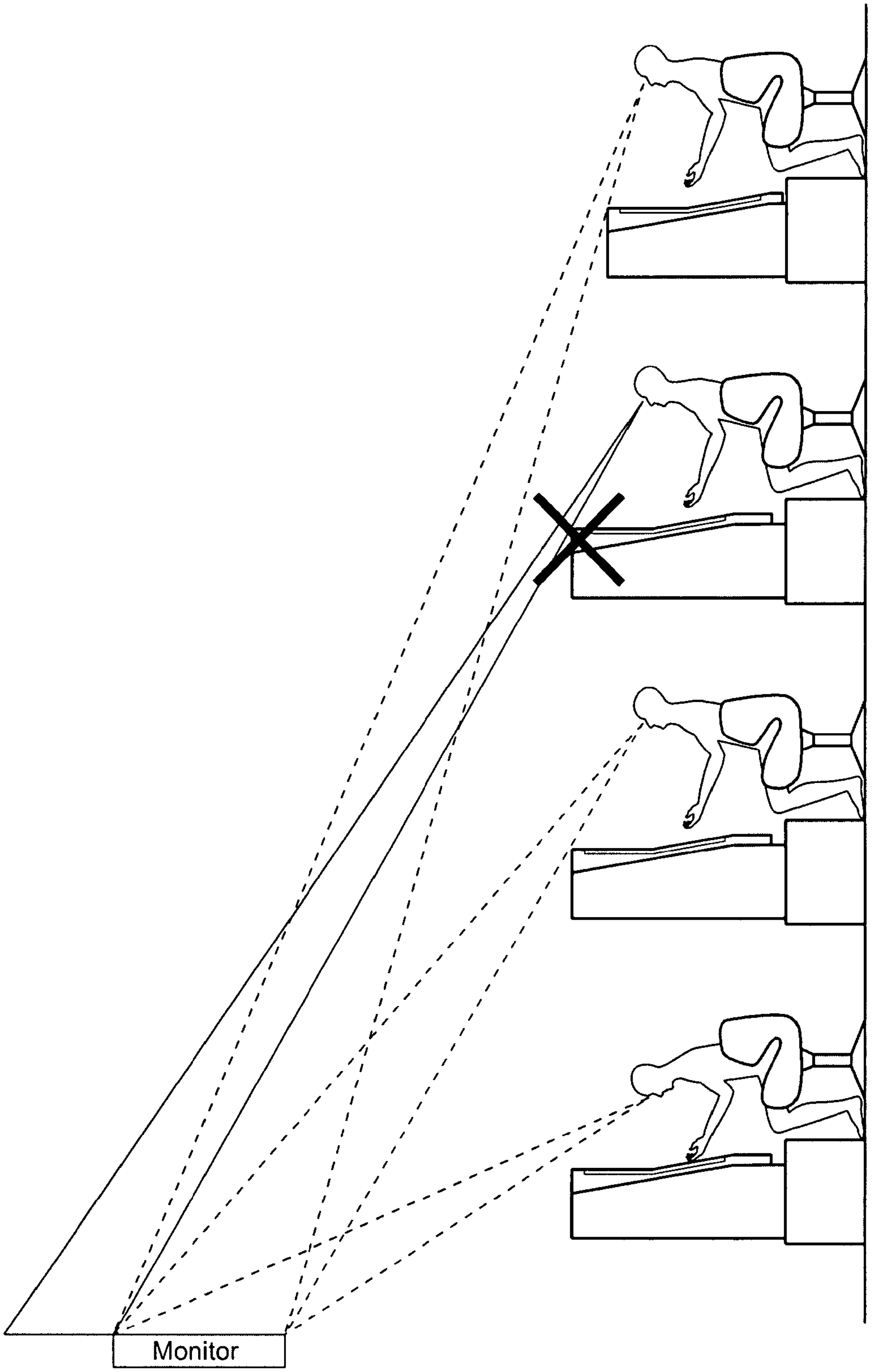
FIG. 1 illustrates a live baccarat player in the count down time of a live baccarat game.

The present invention provides a gaming system for playing a casino game other than a slot machine game and a slot machine game. In some embodiments, the gaming system comprises a main cabinet comprising a mechanism for playing a live baccarat game, a Sic Bo game, a Roulette game, a Fish-Prawn-Crab game, or a Wheel of Fortune game, and a mechanism for playing a slot machine game, and a screen for displaying the slot machine game.

In some embodiments, the main cabinet comprises a upper screen and a lower screen for playing the live baccarat game, the Sic Bo game, or the Roulette game. The screen for displaying the slot machine game can be stand-alone screen or can be connected to the main cabinet. The screen for displaying the slot machine game can be fixed or foldable. In some embodiments, the screen for displaying the slot machine game is connected to the main cabinet, e.g., either connected to the upper screen or connected to the lower screen through a connection mechanism. The connection mechanism can be a hinge(s) or an arm(s). In some embodiments, the connection mechanism is integrated extension of the main cabinet, e.g., the upper or the lower screen. In some embodiments, the connection mechanism comprises hinge(s) (e.g., one, two, three or more hinges), allowing the screen for displaying the slot machine game to be folded to the main cabinet to cover up the upper screen or the lower screen. In some embodiments, the connection mechanism comprises a metallic arm or metallic arm(s) (e.g., one, two, three, or more arms).

In some embodiments, the screen for displaying a slot machine game and/or the live baccarat game can also allow the playing of slot machine games or baccarat games based on a stand alone server.

The mechanism for playing a casino game is well known in the art of gaming. Systems (e.g., devices and apparatus) or parts or components thereof embodying such gaming mechanism or a part thereof is either commercially available or can be readily constructed or built by an ordinary artisan.

In some embodiments, the present invention also provides a software program or a set of software programs for carrying out any or all steps of the betting method described herein. The gaming system can also be incorporated into an electronic device or an entertainment gaming machine. Representative electronic devices include, but are not limited to, laptop computers or desktop computers.

The rules of playing each casino game is well known in the art and well documented. Sometimes, rules for a game can be provided by gaming authorities. For examples, Macao Special Administrative Region the Gaming Inspection and Coordination Bureau of Macao Special Administrative Region, China, provides rules for rules for each casino games played in the region (http://www.dicj.gov.mo/CH/index.htm).

Rules for a few representative casino games are described below.

Live Baccarat Game

Baccarat games are common casino games. The object of baccarat is for the bettor to successfully wager on whether the banker's hand or the player's hand is going to win. The bettor receives even money for his wager if he selects the winning hand and loses his wager if he selects the losing hand. Because of the rules of play of baccarat, the banker's hand has a slightly higher chance of winning than does the player's hand. Therefore, if the bettor wagers on the banker's hand, the bettor is required to pay to the gaming establishment a commission (typically 5%) of the amount the bettor wins. No commission is paid if the bettor successfully wagers on the player's hand.

Conventional methods of playing baccarat are described as follows:

A multiple number of decks of standard playing cards, 52 in number, are used; typically six to twelve decks are shuffled together and placed in a shoe from which the cards are dealt during the play of the game.

Each bettor makes a wager on whether the banker's hand or the player's hand will win. After all wagers are made, two cards are dealt from the shoe to the bank position and two cards are dealt from the shoe to the player's position on the table layout. The cards are turned face up and the value of the banker's hand and the player's hand is determined.

Aces count as one; kings, queens, jacks and tens count as zero and the other cards count as their respective face value. The suits (hearts, diamonds, spades and clubs) have no meaning in baccarat. The highest hand value in baccarat is nine. All hand values range from a low of zero to a high of nine. If when the cards are added together, the total of the hand exceeds nine, then the hand value is determined by subtracting ten from the total of the hand. For example, a seven and nine total sixteen, but the hand value is six. An Ace and a nine total ten, but the hand value is zero.

A two card total of eight or nine is called a "natural"; a two card total of zero is called a "baccarat". As will be explained hereafter, in certain situations in the play of the game, a third card will be dealt. The value of this third card is added to the total of the first two cards and a new hand value is established.

Again, if the new hand total exceeds nine, the hand value is determined by subtracting ten from the total of the hand. Wagering locations are provided on the baccarat table layout. Whichever of the banker's hand or the player's hand is closest to a total of nine is the winner.

The way of betting may differ in different gaming establishments. In the U.S., for example, prior to the deal, each bettor can make one of three wagers: 1) that the banker's hand will win, 2) that the player's hand will win, or 3) that the banker's hand and the player's hand will tie. In Macau, for example, one can make one of five wagers: 1) that the banker's hand will win, 2) that the player's hand will win, 3) that the banker's hand and the player's hand will tie, 4) that the first two cards in the banker's hand are of the same kind, regardless of the type of suit, forming a Bank Pair, or (5) that the first two cards in the player's hand are of the same kind, regardless of the type of suit, forming a Player Pair.

All winning banker's hand wagers in scenario 1) in both the U.S. and Macau are paid off at odds of one-to-one and the house charges a five percent (5%) commission on the amount won by the bettor. For example, if a bettor wagers $100 on the banker's hand and the banker's hand wins, the bettor wins $100 and is charged a $5 commission on the amount that the bettor won. The bettor is not charged any commission on the amount of his wager.

All wagers that select winning player's hand in scenario 2) in both the U.S. and Macau are paid off at odds of one-to-one and the bettor is not charged any commission on the amount of his winnings or his wager.

All winning wagers on the tie in scenario 3) in both the U.S. and Macau can be paid off at odds of eight-to-one (depending on the gaming establishment) and the bettor is not charged any commission on the amount of his winnings or his wager. If a tie hand occurs, all wagers on the banker's hand and all wagers on the player's hand are "pushes" and the amount wagered is returned to the bettor.

All winning wagers on the Bank Pair bet in scenario 4) in Macau can be paid off at odds of eleven-to-one (depending on the gaming establishment) and the bettor is not charged any commission on the amount of his winnings or his wager.

All winning wagers on the Player Pair bet in scenario 5) in Macau can be paid off at odds of eight-to-one (depending on the gaming establishment) and the bettor is not charged any commission on the amount of his winnings or his wager.

The play of baccarat typically uses three casino dealers to operate the game. The casino dealers jointly participate in the shuffling of the decks of cards. After the shuffle is completed, one of the players is typically asked to cut the decks using a plastic cut card. The dealer then separates and restacks the cards from the point of the cut and the dealer or a player then inserts the plastic cut card no less than fifteen cards (in Las Vegas, U.S.) or no less than twelve cards (in Macau) from the ends of the stacked decks and the entire stacked decks are placed into a shoe from which the cards are dealt during the play of the game. When the inserted plastic cut card appears during play, the hand in progress is completed and that round of play then ends. The cards are reshuffled to prepare for the next round of baccarat.

In conventional baccarat, the bettors deal the cards used in the game. Initially, one of the casino dealers (called the "caller") passes the shoe to the bettor sitting in seat number "1" at the baccarat table. After all wagers have been made, the caller tells the bettor with the shoe to begin the deal. The bettor deals a first card to the caller, a first card to himself, a second card to the caller and a second card to himself. All cards are dealt face down. The two cards given to the caller represent the player's hand and the two cards kept by the bettor who is dealing the cards represent the banker's hand.

The caller than allows one of the other bettors to turn up the player's hand. Traditionally, this honor is given to the bettor who has made the largest wager. The bettor turns up the two cards of the player's hand and tosses them to the caller. The caller places these two cards face up in the table location designated for the "player's hand" and the caller announces the point total of the player's hand.

The bettor who has the shoe then turns over the cards of the banker's hand and tosses these two cards to the caller. The caller places these two cards face up in the table location designated for the "banker's hand" and the caller announces to point total of the banker's hand. Depending on the point total of the player's hand and the banker's hand, one more card may be dealt to either the player's hand, the banker's hand, or both. The rules for determining whether a third card is dealt are fixed rules, there is no discretion for either the player's hand or the banker's hand on whether a third card is dealt.

If either the player's hand or the banker's hand has a point total of eight or nine on the first two cards, no third card is dealt to either hand and the hand with the highest point total is the winner (or the hand is a tie, as the case may be). If none of the player's hand or the banker's hand has a point total of eight or nine, then there is a possibility of a third card draw.

The third card draw rules are as follows:

Rule #1: If the initial two card player's hand has a point total of 0, 1, 2, 3, 4 or 5, draws a third card. If the initial two card player's hand has a point total of 6 or 7, the player's hand stands and does not receive a third card.

Rule #2: If the player's hand stands and does not draw a third card, then the banker's hand follows Rule #1. In other words, if the player's hand has a point total of 6 or 7, the banker's hand draws a third card on a point total of 0, 1, 2, 3, 4 or 5 and the banker's hand stands on a point total of 6 or 7.

Rule #3: If the player's hand draws a third card, the banker's hand must draw or stand as described in Table 1.

TABLE 1

| Bank hand two card point total | Bank hand draws when the player's hand third card is: | Bank hand stands when the player's hand third card is: |
|---|---|---|
| 0, 1 or 2 | Bank always draws | — |
| 3 | 0, 1, 2, 3, 4, 5, 6, 7 or 9 | 8 |
| 4 | 2, 3, 4, 5, 6 or 7 | 0, 1, 8 or 9 |
| 5 | 4, 5, 6 or 7 | 0, 1, 2, 3, 8 or 9 |
| 6 | 6 or 7 | 0, 1, 2, 3, 4, 5, 8 or 9 |
| 7 | — | Bank always stands |

All third card draw determinations are automatically made by the caller who is skilled in the game of baccarat. When the rules of baccarat require a third card for the player's hand, the caller will request a card for the player's hand. After the player's hand is completed, the banker's hand is completed in the same fashion. The caller then declares which hand has the highest point total and declares that hand the winner (or the caller declares a tie hand as the case may be).

In conventional baccarat the bettor who acts as the dealer continues to deal the cards until the player's hand wins. As soon as the player's hand wins, it is customary to pass the shoe counterclockwise around the baccarat table to the next bettor so that each bettor has the opportunity to deal the cards. Any bettor may decline to deal the cards. The fact that one of the bettors is physically dealing the cards has no affect on the outcome of the game because the rules for drawing and standing do not allow any discretion on the part of the players.

The players can play the game according to conventional baccarat rules, which may vary from place to place. In one embodiment, the baccarat game is played according to the U.S. rules as used in Las Vegas. In another embodiment, the baccarat game is played according to the baccarat rules promulgated by the government of Macau Special Administration Region.

Roulette

Roulette games are generally grouped into two categories: the European Roulette or English Roulette or the American Roulette. The following provides a general description of the game of Roulette and the rules playing the game.

American Roulette

The Wheel

The game of American Roulette is played on a wheel which consists of thirty-eight slots, each with its own number. The numbers on a Roulette wheel are 1-36, 0, and 00. The numbers alternate pairs of odd numbers with pairs of even numbers. The numbers also alternate between black and red. Both the 0 and 00 slots are green. A dealer, or croupier spins the wheel in one direction and then rolls a small ball in the other direction. The ball then drops into one of the slots as it begins to slow down.

The Table

The table is designed so that the numbers, not including 0 and 00, are lined up into three columns, each of twelve numbers, the first row is 1,2,3; the second row is 4,5,6 and so on. The rest of the table is devoted to the myriad bets the game entails. Betting is broken down into two major categories, inside bets and outside bets. There is no limit to the number of bets one can play

Inside Bets

Straight Bets

This is betting that one particular number on the wheel will come up. This bet is done by placing a chip on top of the number on which you want to bet. If that number wins, the payoff is 35 to 1.

Split Bets

This is betting that one of two numbers that lie next to each other on the table will win. Placing a chip on the line that separates two numbers does this. You win if the ball lands on either number. The payoff is 17 to 1.

Street Bet, Trio Bet, or Three Number Bet

In this bet, a player is wagering that any number in a particular row will hit on the next spin. To make this bet, you must place a chip in the outside line of the row on which you want to bet. You win if any number in the row comes up. The payoff is 11 to 1.

Corner Bet, Square bet, or Four-Number Bet

This bets that one of four numbers will hit on the next spin. The numbers should all be touching and moving a chip into the center of four numbers places the bet. If one of these numbers comes up, you win. This bets pays 8 to 1.

Five-Number Bet

This is betting that either the 0, 00, 1, 2, or 3 will come up on the next roll. To take this bet, place a chip on the outside line that divides the 0 and 1. You will be paid 6 to 1 if any of these numbers come up.

Six Line Bet

This is betting that one of six numbers in two adjacent rows will come up. Place a chip in between two rows on the outside line. If the ball lands on any number in the two rows, you will be paid 6 to 1.

Outside Bets

Red

You are betting that the next number to come up is a red. If the next number landed is red, you will be paid 1 to 1, or even money. To play this bet, place a chip on the box marked "Red".

Black

You are betting that the next number to come up is a black. If the next number landed is black, you will be paid 1 to 1, or even money. To play this bet, place a chip on the box marked "Black".

Even

This is wagering that the ball will land on an even number. This bet does not include 0 or 00. The payoff is 1 to 1. To play this bet, place a chip on the box marked "Even".

Odd

This is wagering that the ball will land on an odd number. The payoff is 1 to 1 if the next number to come up is odd. To play this bet, place a chip on the box marked "Odd".

Low Bet

This is a bet that the next number will be between 1 and 18. The payout is 1 to 1. To play this bet, place a chip on the box marked "Low".

High Bet

This is a bet that the next number will be between 19 and 36. The payout is 1 to 1. To play this bet, place a chip on the box marked "High".

Dozen Bet

These bets divide the table into the numbers 1-12, 13-24, and 25-36. To play this bet, put a chip in one of the three boxes marked "1st 12", "2nd 12" or "3rd 12". This bet pays 2 to 1.

Column Bet

This bets that a number in a particular column will come up on the next spin. The payoff is 2 to 1 and is done by placing a chip at the end of the layout below your desired column where it is marked "2 to 1".

English Roulette

The major difference between English and American Roulette is that English has only a 0 instead of both 0 and 00.

Sic Bo

Sic Bo is an ancient Chinese game meaning 'Dice Pair'. It is played in Southeast Asia, Korea, Nevada and Australia. It is also popular in the Philippines, where it is called 'Hi-Lo'. Sic Bo is played with three dice. The object of the game is to select the individual numbers, or combinations of numbers, that will appear on the dice after the 'throw'.

The possibilities include single dice numbers, two of a kind, three of a kind, or combinations of any two or three of the dice. These are displayed along with payoff odds on the table's layout.

To start, the players make their selection of a possible outcome and place a bet on a chosen possibility. After the bets are made, the dice tumbler is rotated and then set on the table. All winning possibilities of the three dice appear illuminated on the layout.

Winning payoffs range from 1:1 even money for one-of-a-kind, to 180:1 for a specific trio.

Slot Machine Games

Slot machine games are common in all the casino resorts. The rules and general steps of playing a slot machine game is described below:

1. Click "Insert Money" to begin playing.
2. Place one's bet by choosing credits in the denominations offered. The player can usually adjust his/her bet on the left side of the slot machine.
3. View one's balance in the slot machine's credit box.
4. The player can bet the maximum limit by clicking on "Bet Max."
5. If the player does not want to bet the maximum, he/she can click on "Bet One" for individual credits.
6. If the player hits a winning combination, he/she can see your payout on the Payout Table. To check and see how much he/she has won, click on the "Winner Paid" icon.
7. It's usually possible to switch machines while playing the same game. Check for a "Switch Machine" button if you want to try your luck somewhere else.

Description of the Gaming System

The various embodiments of the present invention are described in reference to FIGS. 2-11.

Figure 2:
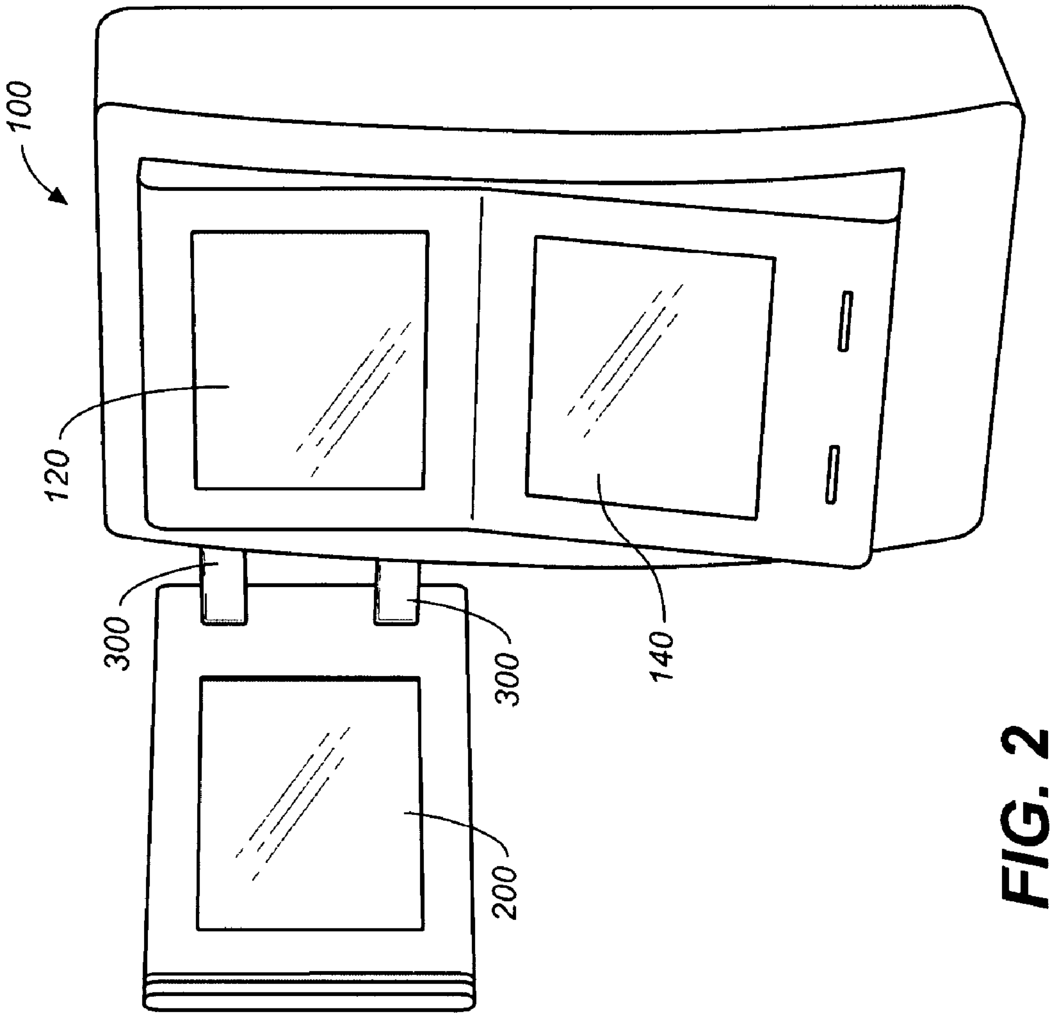
FIG. 2 shows an embodiment of the present invention where a screen for displaying a slot machine game being connected to the upper screen of the main cabinet of a live baccarat gaming system via two hinges.
Figure 3:
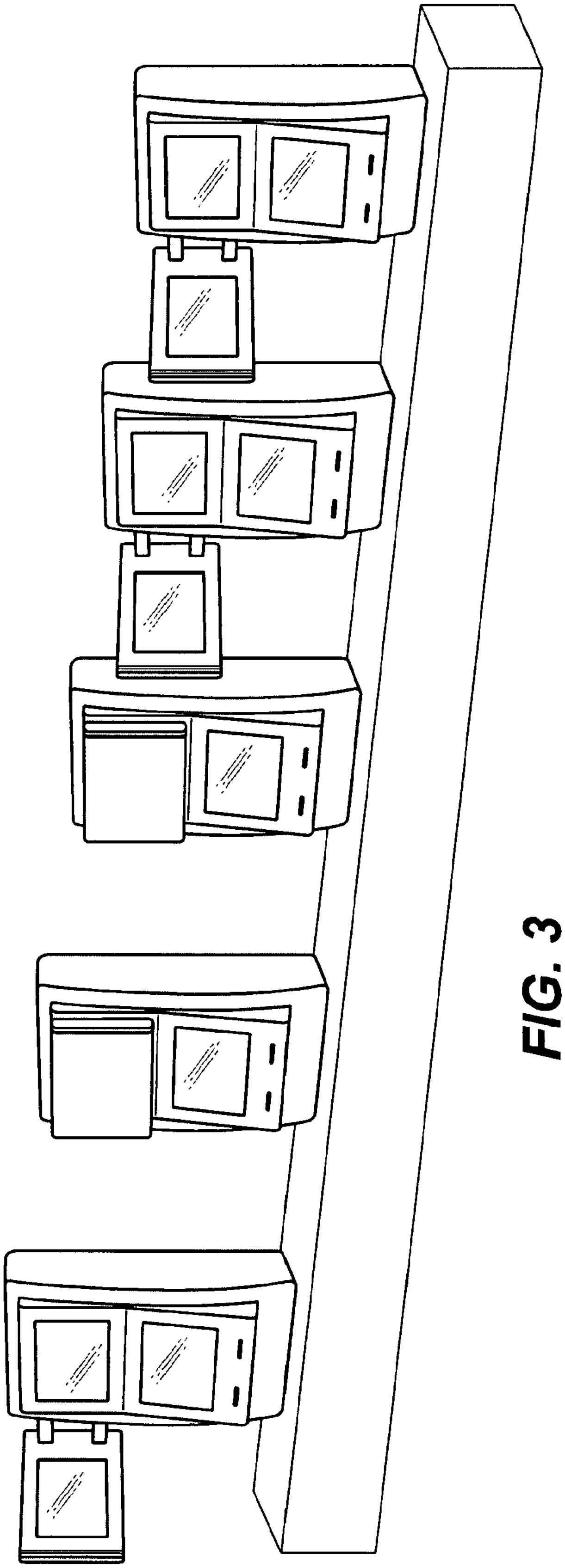
FIG. 3 shows the gaming system of FIG. 2 in a cluster.

Referring to FIG. 2, the gaming system described herein includes a main cabinet 100, which includes an upper screen 120 and a lower screen 140, a screen 200 for displaying slot machine games, and two hinges 300 connecting screen 200 to main cabinet 100. Screen 200 is foldable and can be folded to cover upper screen 120 (FIG. 3). FIG. 3 shows the gaming system of FIG. 2 in a cluster, whereby a plurality of players can use the gaming system to play a game and a slot machine game.

Figure 4:
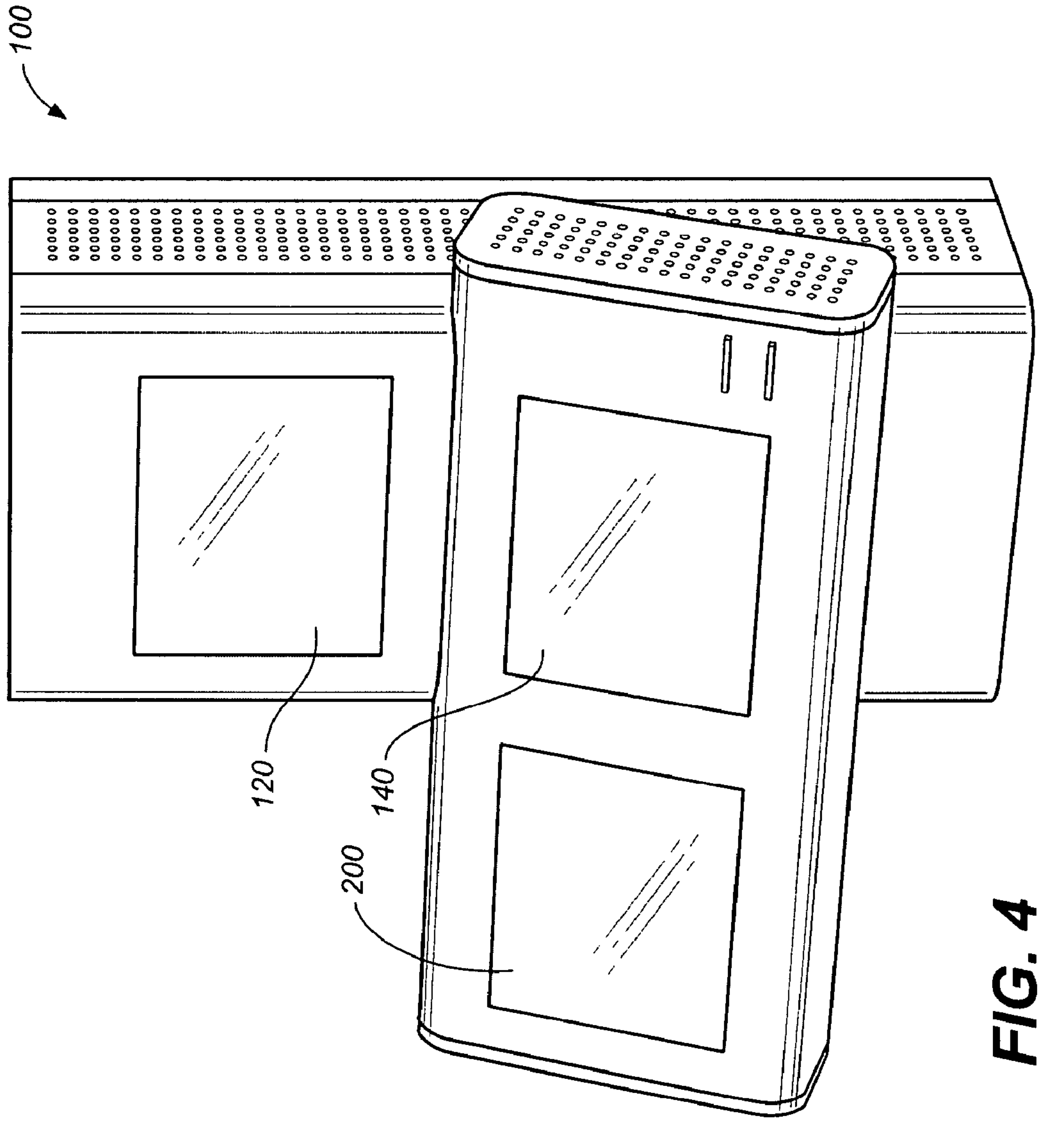
FIG. 4 shows an embodiment of the present invention where a screen for displaying a slot machine game is connected to and extended from the lower screen of the main cabinet of a live baccarat gaming system.
Figure 5:
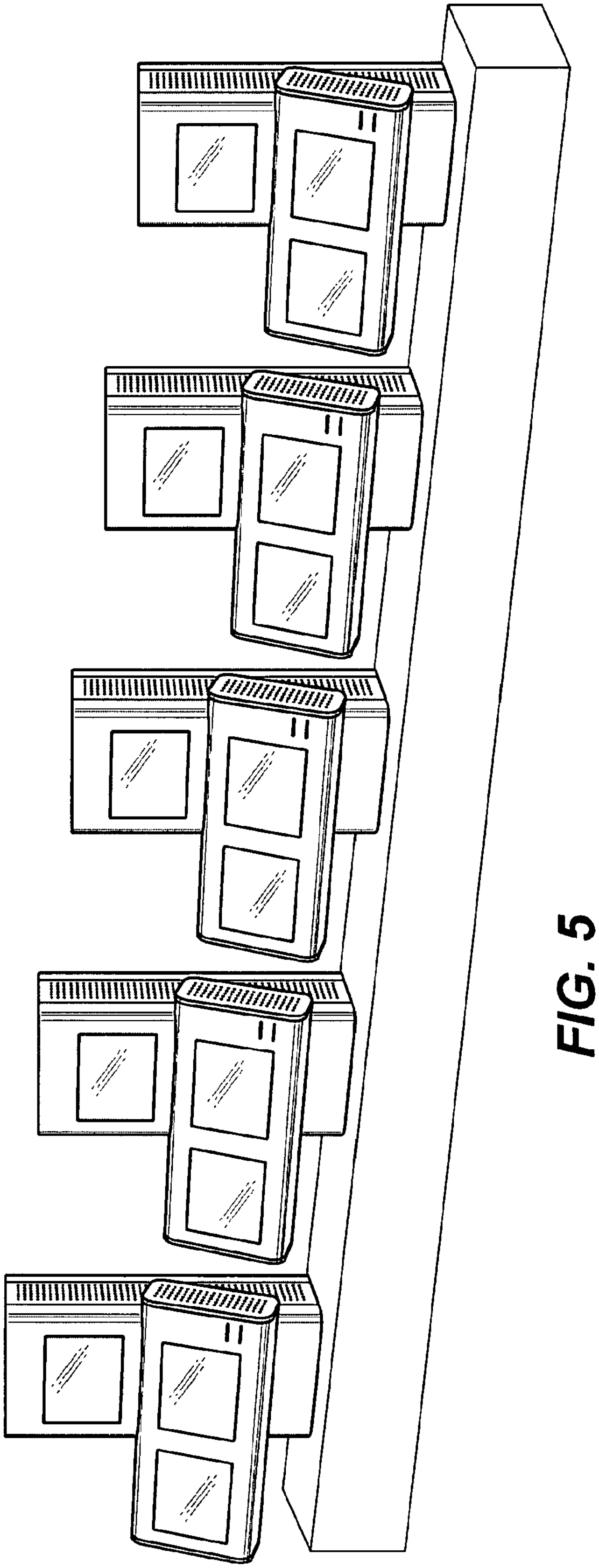
FIG. 5 shows the gaming system of FIG. 4 in a cluster.

Referring to FIG. 4, the gaming system includes a main cabinet 100, which includes an upper screen 120 and a lower screen 140, and a screen 200 for displaying slot machine games. The screen 200 is connected to and integratedly extended from lower screen 140 such that screen 200 and lower screen 140 become a single body. FIG. 5 shows the gaming system of FIG. 4 in a cluster, whereby a plurality of players can use the gaming system to play a game and a slot machine game.

Figure 6:
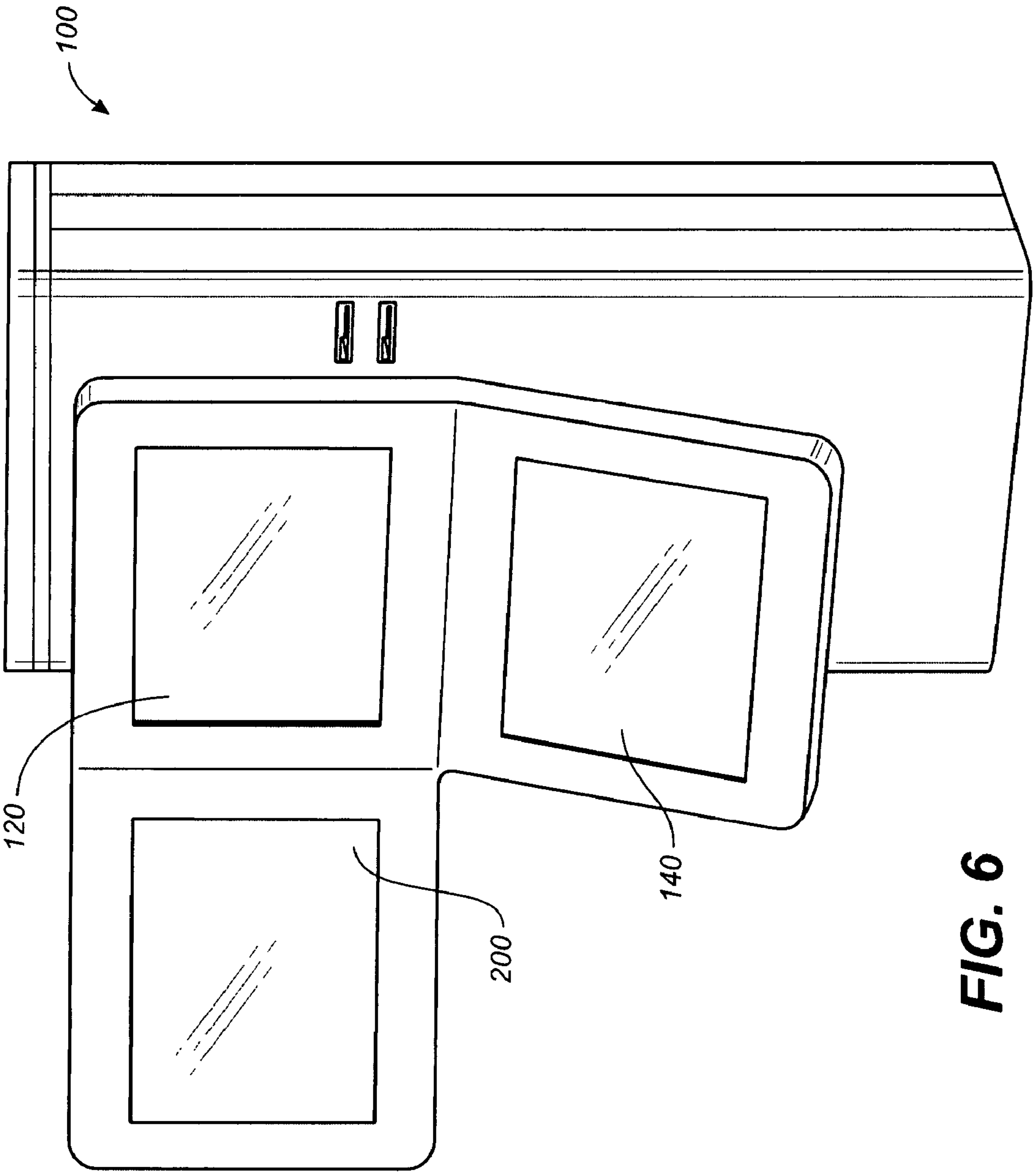
FIG. 6 shows an embodiment of the present invention where a screen for displaying a slot machine game is connected to and extended from the upper screen of the main cabinet of a live baccarat gaming system.
Figure 7:
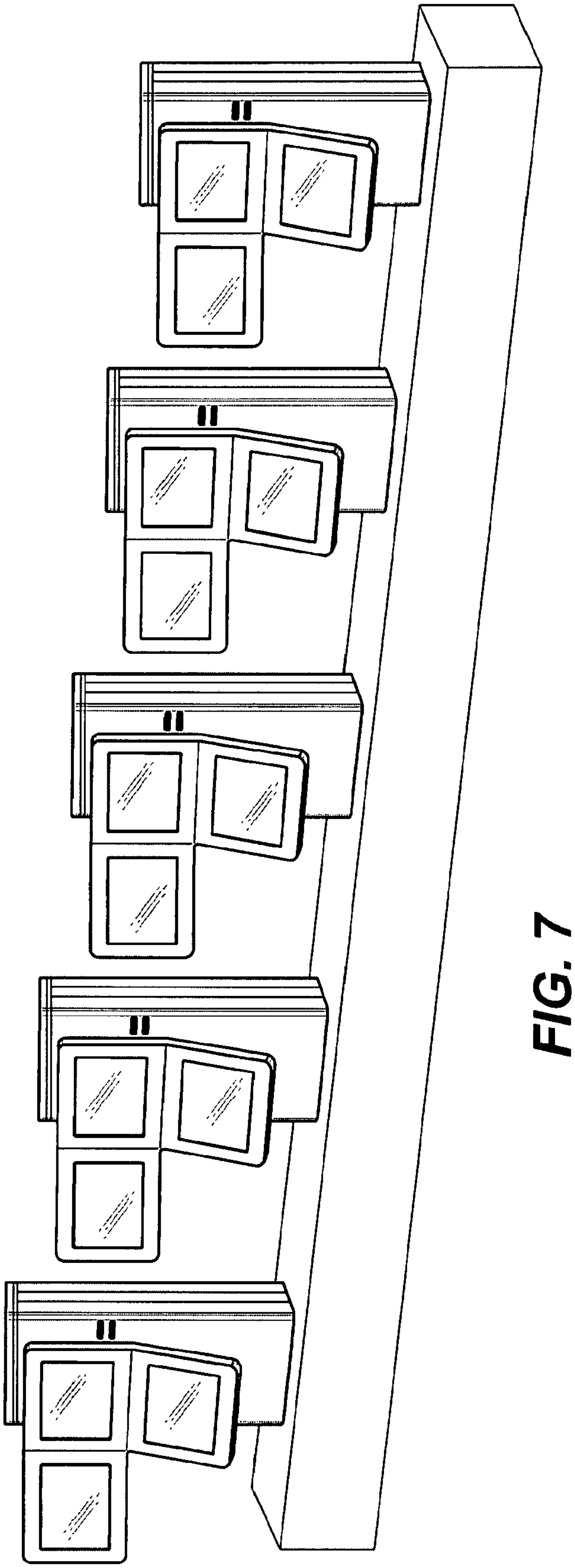
FIG. 7 shows the gaming system of FIG. 6 in a cluster.

Referring to FIG. 6, the gaming system includes a main cabinet 100, which includes an upper screen 120 and a lower screen 140, and a screen 200 for displaying slot machine games. The screen 200 is connected to and integratedly extended from upper screen 120 such that screen 200 and upper screen 120 become a single body. FIG. 7 shows the gaming system of FIG. 6 in a cluster, whereby a plurality of players can use the gaming system to play a game and a slot machine game.

Figure 8:
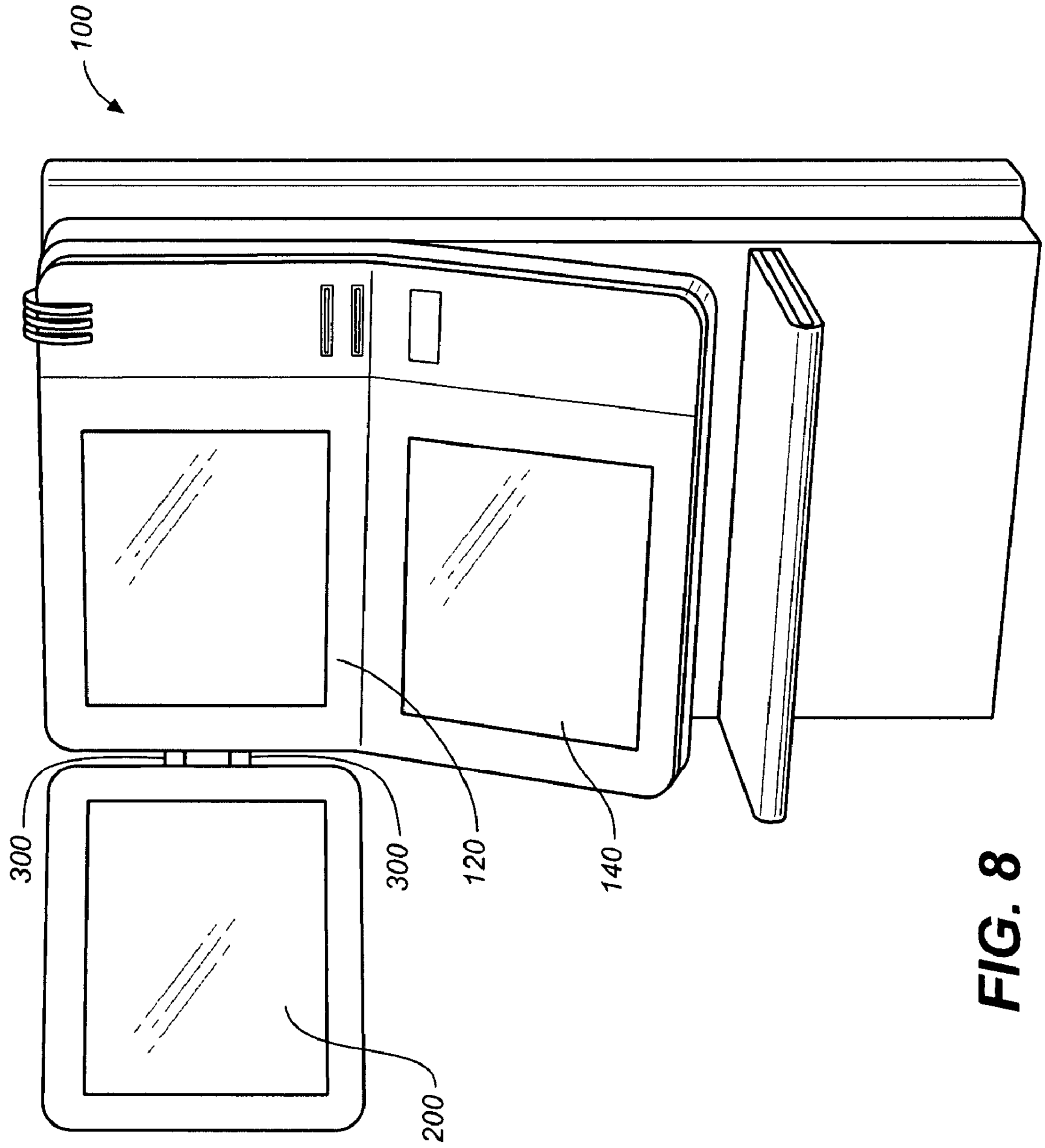
FIG. 8 shows an embodiment of the present invention where a screen for displaying a slot machine game being connected to the upper screen of the main cabinet of a live baccarat gaming system via two metallic arms.
Figure 9:
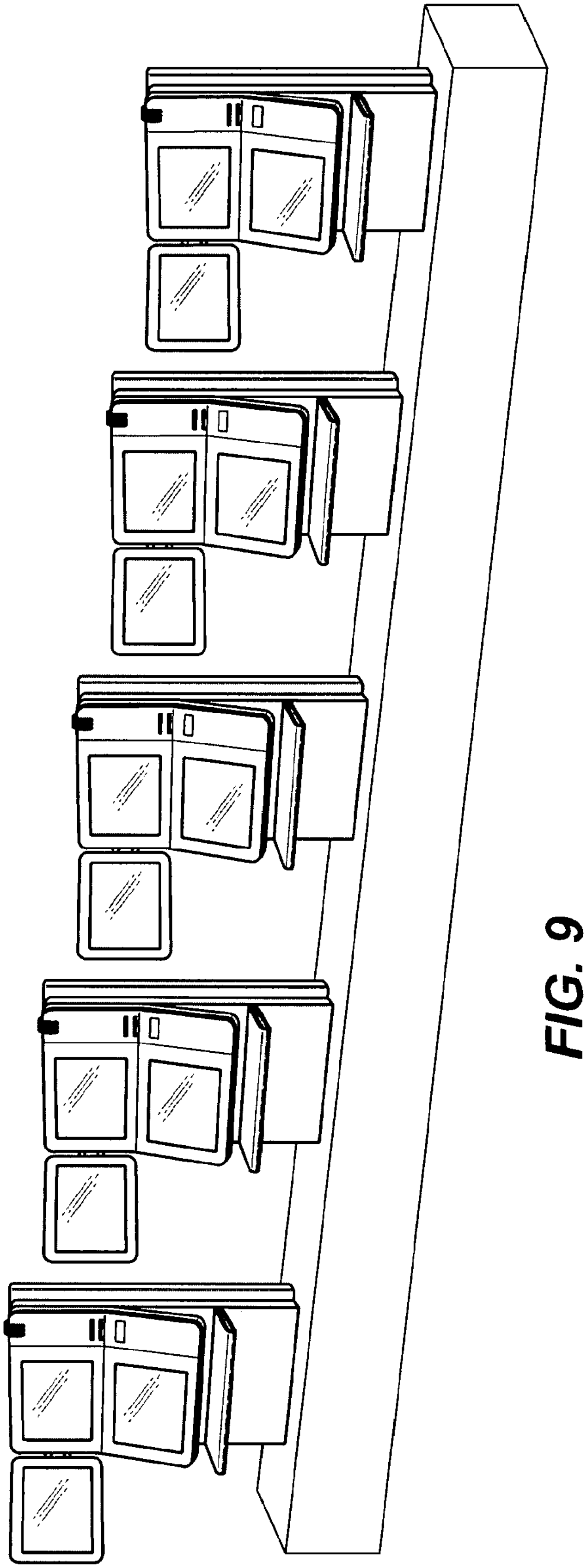
FIG. 9 shows the gaming system of FIG. 8 in a cluster.

Referring to FIG. 8, the gaming system described herein includes a main cabinet 100, which includes an upper screen 120 and a lower screen 140, a screen 200 for displaying slot machine games, and two metallic arms 300 connecting screen 200 to main cabinet 100 by the side of upper screen 120. FIG. 9 shows the gaming system of FIG. 8 in a cluster, whereby a plurality of players can use the gaming system to play a game and a slot machine game.

Figure 10:
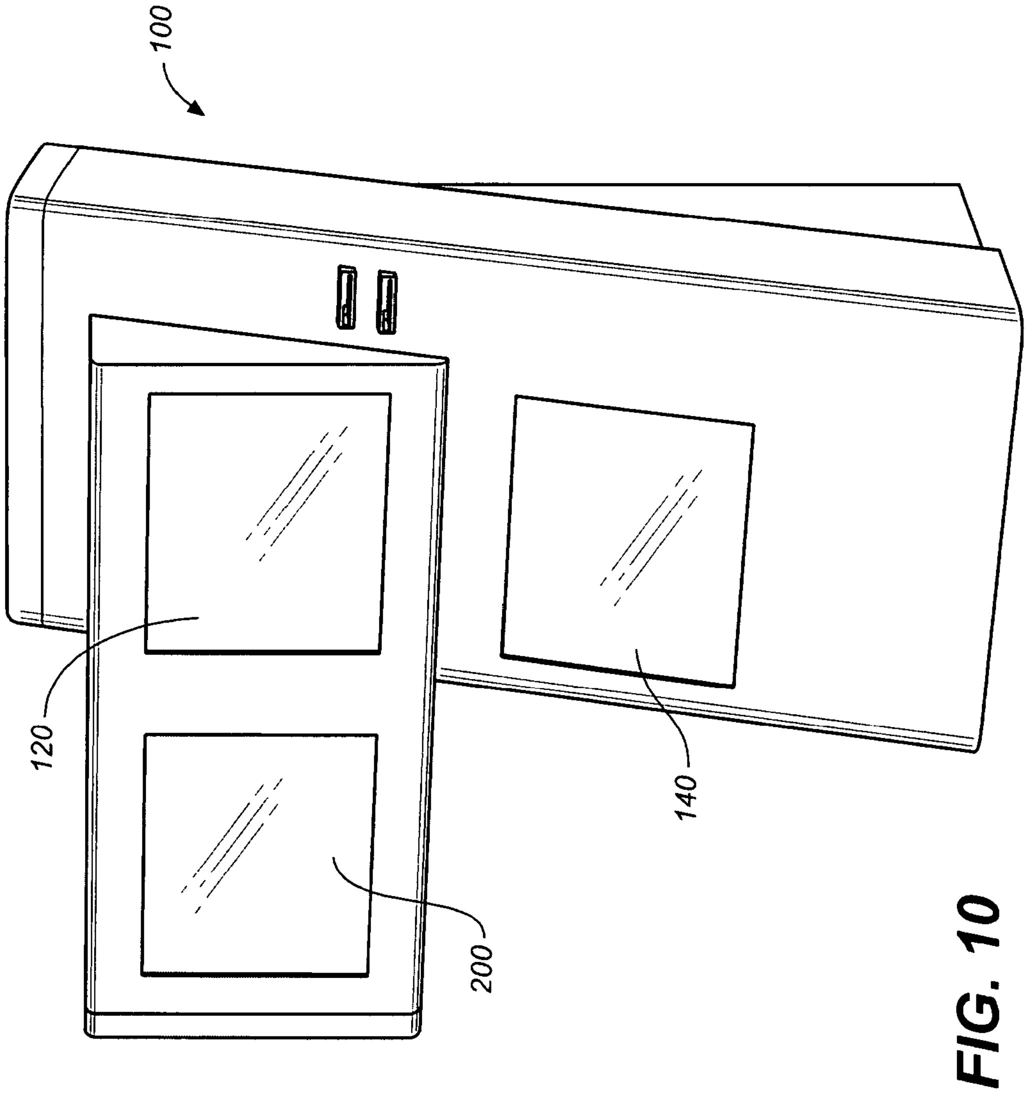
FIG. 10 shows an embodiment of the present invention where a screen for displaying a slot machine game being connected to and extended from the upper screen of the main cabinet of a live baccarat gaming system.
Figure 11:
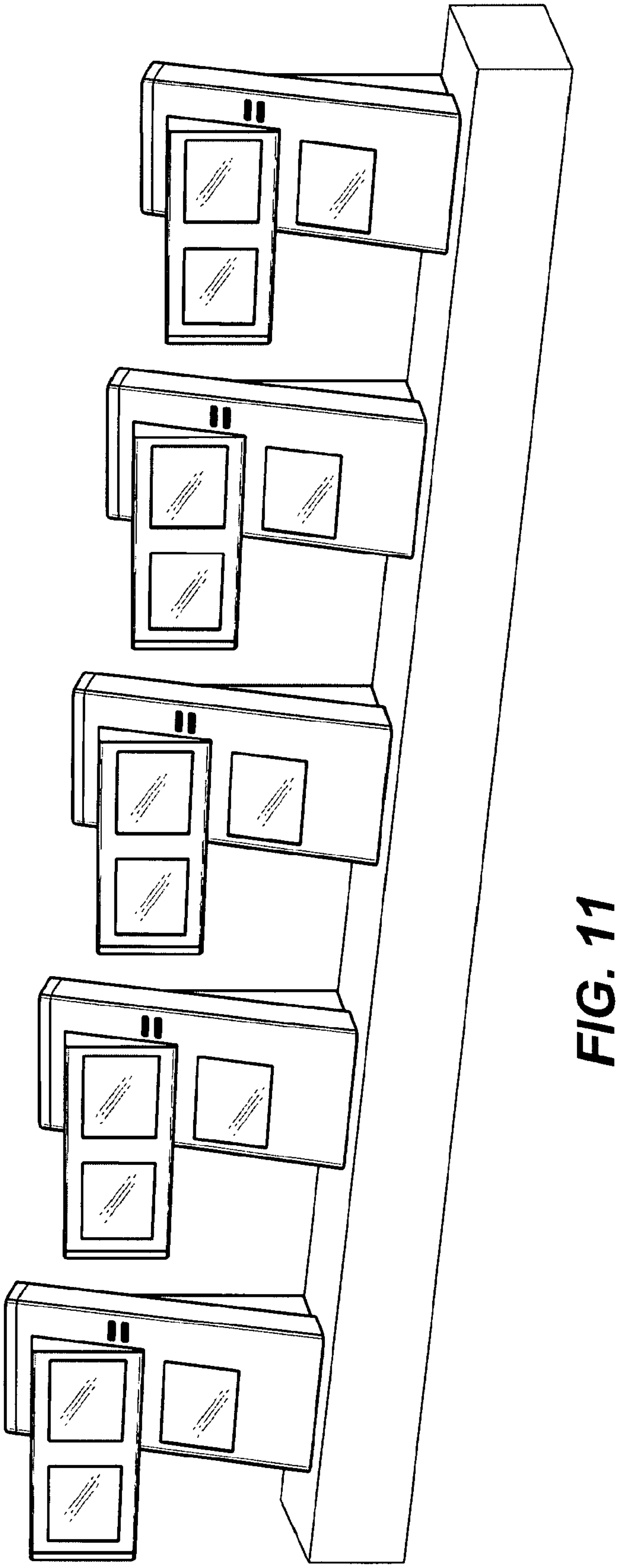
FIG. 11 shows the gaming system of FIG. 10 in a cluster.

Referring to FIG. 10, the gaming system includes a main cabinet 100, which includes an upper screen 120 and a lower screen 140, and a screen 200 for displaying slot machine games. The screen 200 is connected to and integratedly extended from upper screen 120 such that screen 200 and upper screen 120 become a single body. In relation to the surface plane of the main cabinet, upper screen 120 and screen 200 are out of the surface plane of the main cabinet, and lower screen 140 is in the surface plane of the main cabinet. FIG. 11 shows the gaming system of FIG. 10 in a cluster, whereby a plurality of players can use the gaming system to play a game and a slot machine game.

Figure 12A:
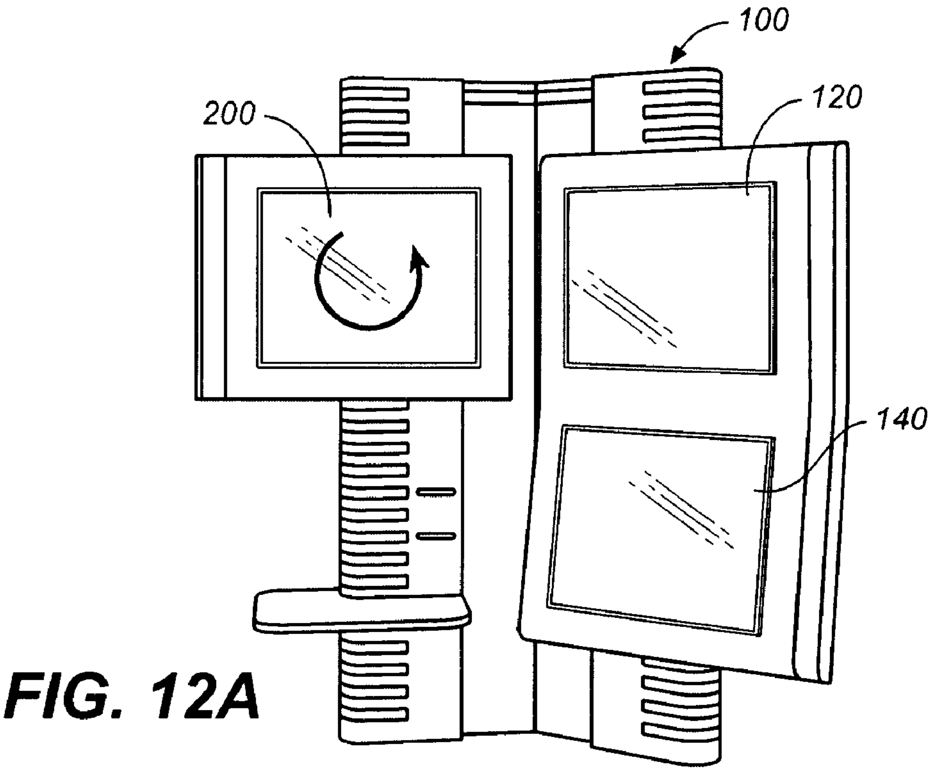
FIGS. 12A and 12B show an embodiment of the present invention where a screen for displaying a slot machine game being attached the main cabinet of a live baccarat gaming system.
Figure 12B:
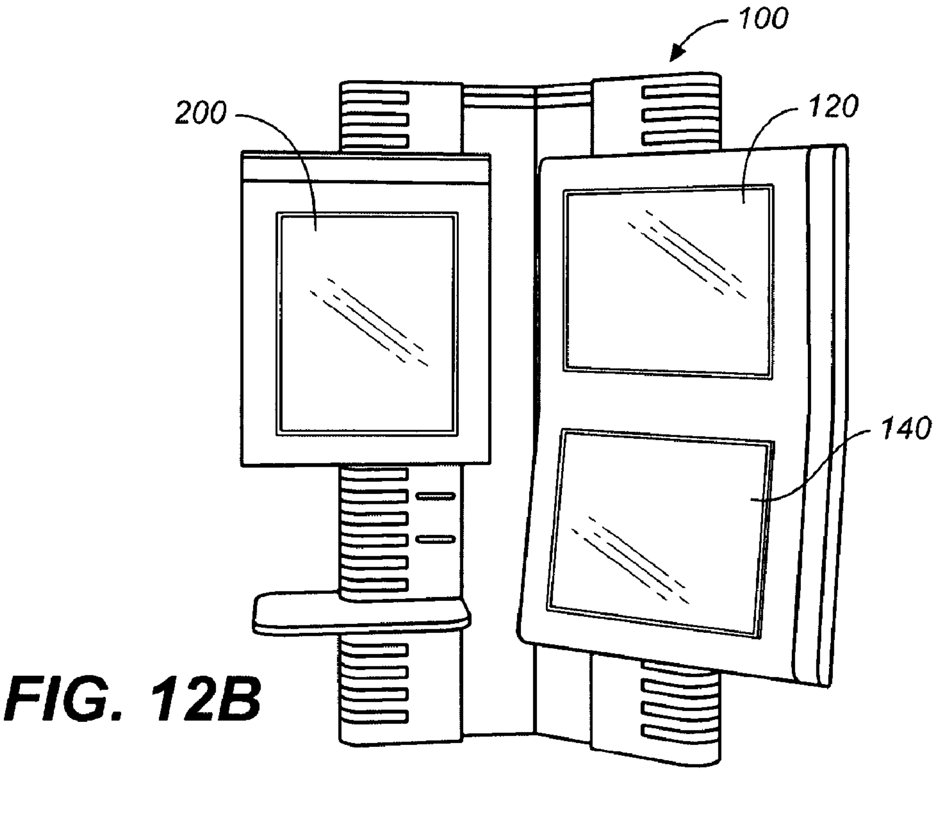

Referring to FIGS. 12A and 12B, the gaming system includes a main cabinet 100 having an upper screen 120 and a lower screen 140 connected or otherwise attached thereto. A screen 200 for displaying a slot machine game is attached to the main cabinet 100 by the side of the upper screen 120. In some embodiments, the screen 200 can be attached to the main cabinet 100 by the side of the lower screen 140. In some embodiments, the screen 200 can be rotated (FIG. 12A) to have an angle (e.g., 90 degree) in relation to screen 120 or screen 140.

The screen for displaying a slot machine game of the various embodiments described above can be fixed or folded.

While particular embodiments of the present invention have been shown and described, it will be obvious to those skilled in the art that changes and modifications can be made without departing from this invention in its broader aspects. Therefore, the appended claims are to encompass within their scope all such changes and modifications as fall within the true spirit and scope of this invention.

I claim:

1. A gaming system, comprising:

a main cabinet comprising a mechanism for playing a game other than a slot machine game, and a mechanism for playing a slot machine game;

a screen for displaying the game other than the slot machine game; and a second additional screen for displaying the slot machine game, wherein said second additional screen is above said screen for displaying the game other than the slot machine game;

wherein the mechanism for playing the slot machine game is adapted to receive second bets from a first user while the first user awaits results of first bets placed on the mechanism for playing the game other than the slot machine game during the countdown time of said game other than the slot machine game, and wherein the results of the first bets are presented independently from the results of the second bets, the results of the first bets appearing on the screen and the results of the second bets appearing on the second additional screen.

2. The gaming system of claim 1, wherein the game other than a slot machine game is a live baccarat game, a Sic Bo game, a Roulette game, a Fish-Prawn-Crab game, or a Wheel of Fortune game.

3. The gaming system of claim 2, wherein the screen for displaying the game other than the slot machine game comprises an upper screen and a lower screen for playing the live baccarat game, the Sic Bo game, the Roulette game, the Fish-Prawn-Crab game, or the Wheel of Fortune game.

4. The gaming system of claim 3, wherein the second additional screen for displaying the slot machine game is connected to the upper screen or the lower screen through a connection mechanism.

5. The gaming system of claim 4, wherein the connection mechanism comprises a hinge(s) or an arm(s).

6. The gaming system of claim 5, wherein the connection mechanism comprises a hinge(s), allowing the second additional screen for displaying the slot machine game to be folded to the main cabinet to cover up the upper screen.

7. The gaming system of claim 5, wherein the connection mechanism comprises a metallic arm(s).

8. The gaming system of claim 3, wherein the second additional screen for displaying the slot machine game is either connected to and integrally extended from the upper screen or the lower screen.

9. The gaming system of claim 8, wherein the second additional screen for displaying the slot machine game is folded.

10. The gaming system of claim 1, wherein the mechanism for a slot machine game comprises a stand-alone server.

11. The gaming system of claim 2, wherein the mechanism for a slot machine game comprises a stand-alone server.

12. The gaming system of claim 3, wherein the mechanism for a slot machine game comprises a stand-alone server.

13. A gaming system, comprising:

a main cabinet comprising a mechanism for playing a game other than a slot machine game, and a mechanism for playing a slot machine game;

a screen for displaying the game other than the slot machine game; and a second additional screen for displaying the slot machine game, wherein said second additional screen is above said screen for displaying the game other than the slot machine game;

a connection mechanism that folds open and closed the second additional screen wherein the mechanism for playing the slot machine game is adapted to receive second bets from a first user while the first user awaits results of first bets placed on the mechanism for playing the game other than the slot machine game during the countdown time of said game other than the slot machine game, and wherein the results of the first bets are presented independently from the results of the second bets, the results of the first bets appearing on the screen and the results of the second bets appearing on the second additional screen.

* * * * *